United States Patent [19]

Okada

[11] Patent Number: 4,730,120

[45] Date of Patent: Mar. 8, 1988

[54] AUTOMATIC LOCKING DEVICE FOR AUTOMOBILE DOOR

[76] Inventor: Takao Okada, 2-57, Ningyo, 1-chome, Kounosu-shi, Saitama-ken, Japan

[21] Appl. No.: 903,248

[22] Filed: Sep. 3, 1986

[30] Foreign Application Priority Data

Sep. 3, 1985 [JP] Japan ................................ 60-194379

[51] Int. Cl.[4] .............................................. B60R 25/04

[52] U.S. Cl. ................................ 307/10 AT; 70/263; 180/289

[58] Field of Search ............ 307/10 AT; 70/262, 263; 180/287, 289

[56] References Cited

U.S. PATENT DOCUMENTS 3,399,554 9/1968 Hogue .................................. 70/262

4,240,516 12/1980 Henderson et al. ........... 307/10 AT 4,327,353 4/1982 Beard et al. ................... 307/10 AT 4,572,320 2/1986 Robbins, Jr. .......................... 70/263

OTHER PUBLICATIONS

Japanese Utility Model Early-Publication No. 56-112250.

*Primary Examiner*—Bernard Roskoski

*Attorney, Agent, or Firm*—Finnegan, Henderson, Farabow, Garrett & Dunner

[57] ABSTRACT

An automatic locking device for an automobile door which can automatically lock a door a few seconds after the key is removed from the ignition switch and the door is closed. The device includes a key switch for detecting the insertion and removal of a key, a door switch for controlling the power source, and time-differential-type relays for operating an actuator.

5 Claims, 1 Drawing Figure

AUTOMATIC LOCKING DEVICE FOR AUTOMOBILE DOOR

BACKGROUND OF THE PRESENT INVENTION

1. Field of the Invention

This present invention relates to a device for automatically locking an automobile door.

2. Description of the Prior Art

Conventionally, automobile door locking operations are defective in that when locking an automobile door a cylinder lock on the outside of the door is operated by a key, or a dual operation must be carried out in which the locking button within the car is operated when opening the door and the door is closed to lock it by means of the outer door handle.

SUMMARY OF THE INVENTION

The object of this invention is to provide an automatic locking device for an automobile door, featured by an arrangement to prevent automatic locking of the door when the door is closed while the key is left in the ignition switch. Another object of this invention is to provide an automatic locking device for an automobile door provided with an arrangement such that the door cannot be locked by means of the operation of a manual switch when the door is open. Still another object of this invention is to provide an arrangement by which the door cannot be locked even if the lock knob is manually operated. According to this invention, the door is only automatically locked a few seconds after the key is removed from the ignition switch and the door is closed.

Thus, the automatic locking device of this invention comprises time-differential relays for operating an actuator connected to a key switch for detecting the insertion and removal of the key, a door switch for controlling a power source, a timer for controlling the time-differential relays, a manual switch, and a further relay that is connected to a door lock switch.

DESCRIPTION OF THE PREFERRED EMBODIMENT

Figure 1:
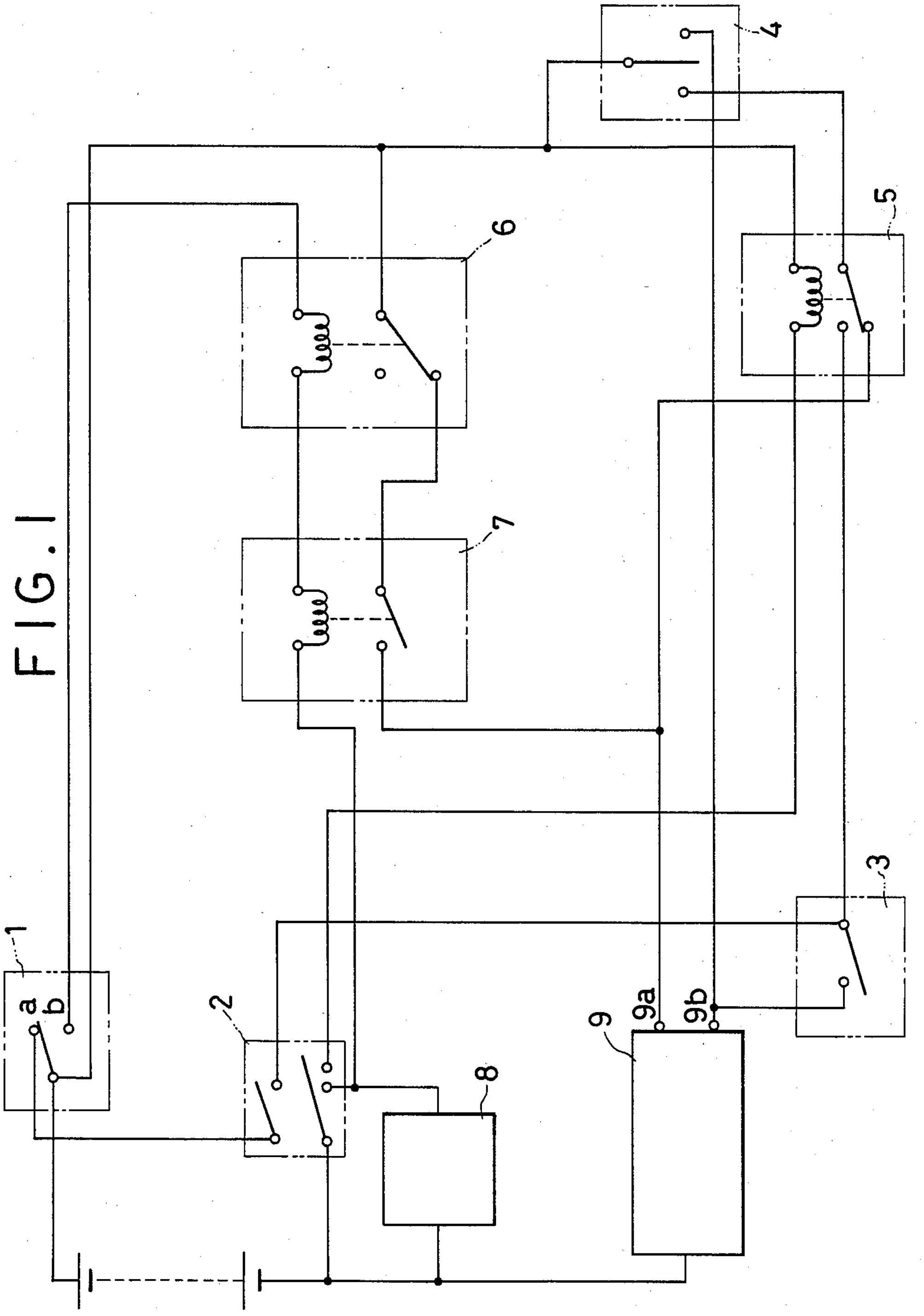
FIG. 1 is a circuit diagram showing an embodiment of an automatic locking device of an automobile door of the present invention.

An embodiment of this invention will now be described by reference to the drawing.

In FIG. 1, an ignition key switch 1 is connected in series to the plus side of a power source. It detects the removal and insertion of an ignition key. The key switch 1 is operated to close a terminal a when a key is inserted in the key switch 1, and to close a terminal b when a key is removed from it. A door switch 2 is connected in series both to the power source and to the key switch 1, for controlling both electrodes of the power source. The door switch 2 comprises two interrelated switches, and becomes ON when the door is opened or becomes OFF when the door is closed. A door lock switch 3 is operated to connect the door switch 2 and a relay 5 with a terminal **9*b* of an actuator 9. The door lock switch 3 becomes ON when a locking button (not shown), for example, is operated to lock the door. A manual switch 4 controls the actuator 9 to lock or unlock the door. The relay 5 is connected in series to the door switch 2. The relay 5 connected the manual switch 4 with a terminal 9*a* of the actuator 9 when the door is closed or the door switch 2 is OFF, while the relay 5 connects the manual switch 4 with the door switch 3 when the door is opened or the door switch in ON. Time-differential-type relays 6 and 7 are connected in series and are also connected in series to the key switch 1 and a timer 8. When the current does not flow through these relays 6 and 7, the relay 6 is closed and the relay 7 is open. When the current flows, the relay 6 becomes open and the relay 7 becomes closed. They return to their original condition after a lapse of a predetermined reset time after the current is stopped by the timer 8. The reset time of the relay 7 is set to be longer than that of the relay 6. When the relays 6 and 7 return to their original position or condition, the relay 6 is closed, while the relay 7 is opened. The timer 8 maintains for a predetermined time the current supplied to the time-differential-type relays 6 and 7 which are connected to the door switch 2. Two coils to be connected to the outer circuits are provided in the actuator, although they are not shown in the drawings. The terminal 9*a* of the actuator 9 is connected to one of the coils for locking the door, and the terminal 9*b*** is connected to the other coil for unlocking the door.

In operation, when removing the key from the key switch 1 and opening the door, the current passes through the door switch 2 for operating the time-differential relays 6 and 7. When the door is closed after the above operation, the timer 8 begins to run to keep the current passing through the time-differential-type relays 6 and 7 for a few seconds. Then the timer 8 breaks the current passing through the relays 6 and 7, so that the time-differential-type relay 6 returns to its original position in a few seconds. At the same time, current passes through the actuator 9 to lock the door, since the relay 7 continues to be ON. Then the relay 7 returns to its original position, so that the current passing through the relays 6 and 7 and the actuator 9 stops.

When the key is inserted into the key switch 1, the current does not pass through time-differential-type relays 6 and 7, even when the driver gets out of an automobile and closes the door. Therefore the door is not locked automatically. When the door is opened, even if the locking operation of the door is carried out by means of the manual switch 4, the actuator 9 is not operated because the door lock switch 3 opens and the relay 5 is operated. Therefore the door is not locked. When the door lock switch 3 is manually operated when the door is opened, the current only flows to the terminal **9*b***, which is connected to the coil for unlocking the door of the actuator. Thus, the door is not locked. When the driver is in the automobile and closes the door, the locking and the unlocking of the door can be carried out by the manual switch and the manual operation.

As mentioned above, this invention is advantageous in that the problem of accidental locking of the door when the driver leaves the car with the key in the ignition switch is prevented and the door can be automatically locked without carrying out the locking operation. Therefore it is possible to provide an automatic locking device for an automobile door that is very convenient, simple, and cheap.

I claim:

1. An automatic locking device for an automobile door comprising:

an ignition key switch for detecting a presence and absence of a key;

an actuator operative to lock the automobile door when electrically energized;

a door switch operated to a first state at times when the door is open and operated to a second state at times when the door is closed;

first and second relay means;

first circuit means responsive to the operation of the door switch to said first state at times when said key switch detects the absence of the key for operating said first and second relay means to a first state and responsive to the operation of said door switch to said second state for operating said first and second relay means to a second state;

said first relay means being operative from said first to said second state during a time period greater than the time period for the operation of said second relay means from said first to said second state upon operation of said door switch for momentarily placing said first and second relay means in a different one of said first and second states; and second circuit means operative to electrically energize said actuator to lock said door at times when said second relay means is in said first state and said second relay means is in said second state.

2. An automatic locking device according to claim 1, further including:

timing circuit means, including a timer, operative in response to the operation of said door switch to said second state upon closing the door for delaying the operation of both said first and second relay means to said second state.

3. An automatic locking device according to claim 2, further comprising third circuit means, including a third relay, responsive to the operation of said door switch to said first state upon opening the door for operating said third relay from a first to a second state; and manual switch circuit means operative when activated to energize said actuator to said first state for locking the door only at times when said third relay is in said first state.

4. An automatic locking device according to claim 1, wherein said first and second relay means are energized upon operation of said door switch to said first state upon opening the door and deenergized upon operation of said door switch to said second state upon closing the door.

5. An automatic locking device according to claim 4, wherein said first relay means includes a first contact closed at times when said first relay means is energized and said second relay means includes a second contact closed at times when said second relay means is deenergized, said first and second contacts being connected in series.

* * * * *